United States Patent
Gonzalez del Solar et al.

(10) Patent No.: US 10,635,728 B2
(45) Date of Patent: Apr. 28, 2020

(54) MANIFEST-DRIVEN LOADER FOR WEB PAGES

(71) Applicant: Microsoft Technology Licensing, LLC, Redmond, WA (US)

(72) Inventors: Peter Blair Gonzalez del Solar, Mercer Island, WA (US); Marc Pasarin Soler, Seattle, WA (US); Ian Clanton-Thuon, Seattle, WA (US); Patrick Miller, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 15/633,548

(22) Filed: Jun. 26, 2017

(65) Prior Publication Data
US 2018/0052811 A1 Feb. 22, 2018

Related U.S. Application Data

(60) Provisional application No. 62/375,896, filed on Aug. 16, 2016.

(51) Int. Cl.
*G06F 17/00* (2019.01)
*G06F 16/951* (2019.01)
(Continued)

(52) U.S. Cl.
CPC .......... *G06F 16/951* (2019.01); *G06F 3/0481* (2013.01); *G06F 3/04842* (2013.01);
(Continued)

(58) Field of Classification Search
CPC .... G06F 16/951; G06F 16/958; G06F 16/986; G06F 16/258; G06F 3/0481;
(Continued)

(56) References Cited

U.S. PATENT DOCUMENTS

| | | |
|---|---|---|
| 7,594,003 B2 | 9/2009 | Davidson et al. |
| 7,814,410 B2 | 10/2010 | Kothari et al. |

(Continued)

OTHER PUBLICATIONS

Burtoft, J., Understanding the Manifest for Web App, (2015), downloaded from <"https://thishereweb.com/understanding-the-manifest-for-web-app-3f6cd2b853d6">, 5 pages.*
(Continued)

*Primary Examiner* — Cesar B Paula
*Assistant Examiner* — James H. Blackwell
(74) *Attorney, Agent, or Firm* — Liang IP, PLLC

(57) ABSTRACT

Computer systems, devices, and associated methods of loading a bundle component, comprising a bundle of scripts and a manifest including metadata for the bundle, that is compatible with a dependent bundle component are disclosed herein. In one embodiment, a method includes identifying a bundle component identifier and a version identifier for the bundle component that the dependent bundle component depends on in a manifest associated with the dependent bundle component. The method then includes retrieving a manifest for a bundle component that includes the bundle component identifier and is a most recent compatible version of the bundle component. The method includes loading the most recent compatible bundle component based on a URL in the retrieved manifest for the bundle component.

20 Claims, 9 Drawing Sheets

(51) Int. Cl.
*G06F 16/25* (2019.01)
*G06F 16/958* (2019.01)
*H04L 29/08* (2006.01)
*G06F 3/0484* (2013.01)
*G06F 3/0481* (2013.01)
*G06F 17/21* (2006.01)
*G06F 8/41* (2018.01)
*G06F 8/71* (2018.01)
*G06F 9/445* (2018.01)
*G06F 8/70* (2018.01)
*G06F 8/60* (2018.01)
*G06F 8/65* (2018.01)
*G06F 8/61* (2018.01)

(52) U.S. Cl.
CPC .......... *G06F 16/258* (2019.01); *G06F 16/958* (2019.01); *G06F 16/986* (2019.01); *G06F 17/211* (2013.01); *H04L 67/22* (2013.01); *G06F 8/433* (2013.01); *G06F 8/60* (2013.01); *G06F 8/61* (2013.01); *G06F 8/65* (2013.01); *G06F 8/70* (2013.01); *G06F 8/71* (2013.01); *G06F 9/44505* (2013.01); *G06F 9/44521* (2013.01); *G06F 9/44536* (2013.01); *G06F 9/44552* (2013.01); *H04L 67/1097* (2013.01)

(58) Field of Classification Search
CPC ...... G06F 3/04842; G06F 17/211; G06F 8/71; G06F 9/44536; G06F 8/61; G06F 8/65; G06F 8/658; G06F 8/70; G06F 9/44552; G06F 8/433; G06F 8/60; G06F 9/44521; G06F 9/44505; H04L 67/22; H04L 67/1097
See application file for complete search history.

(56) References Cited

U.S. PATENT DOCUMENTS

| | | |
|---|---|---|
| 7,836,303 B2 | 11/2010 | Levy et al. |
| 7,890,487 B1 | 2/2011 | Hess et al. |
| 7,984,115 B2 | 7/2011 | Tien et al. |
| 8,010,890 B2 | 8/2011 | Gumz et al. |
| 8,682,672 B1 | 3/2014 | Ha et al. |
| 8,972,856 B2 | 3/2015 | Channabasavaiah |
| 9,092,538 B2 | 7/2015 | Katz et al. |
| 9,195,477 B1 | 11/2015 | Spencer |
| 9,282,137 B2 | 3/2016 | Seshadri et al. |
| 9,325,806 B2 | 4/2016 | Bapst et al. |
| 9,331,957 B2 | 5/2016 | Kaplinger et al. |
| 2005/0050461 A1* | 3/2005 | Hall ............ G06F 16/957 715/205 |
| 2006/0167981 A1* | 7/2006 | Bansod ............ G06F 9/547 709/203 |
| 2006/0248166 A1 | 11/2006 | Milosevic et al. |
| 2007/0245310 A1 | 10/2007 | Rosenstein et al. |
| 2008/0183593 A1 | 7/2008 | Dierks |
| 2012/0101907 A1 | 4/2012 | Dodda |
| 2013/0067459 A1* | 3/2013 | Sannidhanam ....... G06F 8/61 717/176 |
| 2014/0189498 A1 | 7/2014 | Liverant et al. |
| 2015/0120821 A1 | 4/2015 | Bendell |
| 2015/0373034 A1 | 12/2015 | Seshadri et al. |
| 2016/0055277 A1 | 2/2016 | Lahav et al. |
| 2016/0140626 A1 | 5/2016 | Agarwal et al. |
| 2018/0052809 A1 | 2/2018 | Nguyen et al. |
| 2018/0052940 A1 | 2/2018 | Miller et al. |

OTHER PUBLICATIONS

Zartner, el al., "Using the application cache", Published on: May 30, 2014 Available at: https://developer.mozilla.org/en-US/docs/Web/HTML/Using_the_application_cache.

"Non Final Office Action Issued in U.S. Appl. No. 15/622,986", dated Jan. 28, 2019, 13 Pages.

* cited by examiner

```
                                                                    141
                                                                  ↙
      {
142 ⌒ "id": "39840115-7B7C-4054-A33A-F5C8FA1EA4E9",
      "alias": "HelpBubble",
146 ⌒ "componentType": "Library",
144 ⌒ "version": "1.0.0",
      "manifestVersion": 2,
148 ⌒ "loaderConfig": {
 150 ⌒   "entryModuleId": "@microsoft/help-bubble",
 152 ⌒   "internalModuleBaseUrls": [
            "https://localhost:4321/"
         ],
 154 ⌒   "scriptResources": {
  155 ⌒      "@microsoft/logging-system": {
               "type": "component",
               "version": "1.2.3",
               "id": "1ABF0C79-D41B-44D2-974E-0188081F6A4A"
            },
  156 ⌒    "help-icons": {
               "type": "path",
               "path": "dist/help-icons.js"
            },
  157 ⌒    "@microsoft/help-bubble": {
               "type": "localizedPath",
               "defaultPath": "dist/help-bubble.js",
               "paths": {
                  "en-us": "dist/help-bubble-english-usa.js",
                  "en-ca": "dist/help-bubble-english-canada.js",
                  "de-de": "dist/help-bubble-german.js"
               }
            },
         }
      }
   }
```

*FIG. 2*

ABC Company Portal

November

| Sunday | Monday | Tuesday | Wednesday | Thursday | Friday | Saturday |
|---|---|---|---|---|---|---|
|  |  |  |  |  |  | 1 |
| 2 Softball game | 3 | 4 | 5 Sales Happy Hour | 6 | 7 All hands meeting | 8 |
| 9 | 10 | 11 Veterans Day | 12 | 13 | 14 | 15 |
| 16 | 17 | 18 | 19 | 20 | 21 | 22 |
| 23 | 24 | 25 | 26 | 27 | 28 Lunch Presentation | 29 |
| 30 |  |  |  |  |  |  |

*FIG. 3B*

MANIFEST-DRIVEN LOADER FOR WEB PAGES

CROSS-REFERENCE TO RELATED APPLICATIONS

This application is a Non-provisional Application of and claims priority to U.S. Provisional Patent Application No. 62/375,896, filed on Aug. 16, 2016, the disclosure of which is incorporated herein in its entirety.

BACKGROUND

A web page is a document that can be read by web browsers for displaying designed information to users. A web page can include text, pictures, videos, or other suitable content items. A web page can also include style sheets, scripts, or other types of metadata describing how various content items are to be displayed. Upon receiving a web page, web browsers can render and output the various content items of the web page in accordance with the associated style sheets, scripts, or other types of metadata. A web page can also include interactive elements such as links to other web pages. As such, when a user clicks on a link, the web browser can display another web page, start a video, play a sound, or perform other suitable actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A web site typically contains multiple web pages and associated content items hosted on one or more web servers of a web site owner. In certain implementations, web applications can be utilized to render web pages. For example, different web pages of the web site may be rendered by different web applications. The web site can also deploy scripts or plug-in units to the web application and having executables and associated library files in order to provide enhanced user experiences. For example, scripts or plug-in units can be executed upon request to dynamically retrieve updated information from external sources, query back-end databases based on user input, or perform other suitable actions.

Such an arrangement, however, presents a challenge when the web site is not hosted on web servers belonging to the web site owner but on those belonging to a hosting service. For example, a cloud service provider can provide servers, network storage devices, or other computing resources in a data center to host the web site according to a contract with the web site owner. The cloud service provider, however, has no control or even knowledge of any scripts or plug-in units deployed in the hosted web site and executed by a host web application. Thus, executing scripts or plug-in units on the servers of the cloud service provider can potentially cause damages to hardware/software components of the servers intentionally or accidentally.

Several embodiments of the disclosed technology can address at least some of the foregoing challenges by shifting execution of the web applications from the server side to the client side, e.g., on a client computing device. In one implementation, a developer can configure a web application by (i) defining various content items of the web page and associated rendering format and (ii) defining various functional components or "actions" of the web application using a TypeScript, JavaScript, or other suitable types of scripting or client-executable computer language. Based on the software implementations from the developer, a compiler can generate web packages for images, texts, or other suitable static content items. Such static content items can be stored and distributed in, for example, various content distribution network ("CDN") servers for ready retrieval. The compiler can also generate a manifest associated with the web application. The manifest can include definitions of a list of "actions" or modules of the web application. The modules can include software codes to render a web page object in a particular fashion, retrieve information from designated sources to be displayed on the web page, and periodically update the information to the web page, or perform other suitable functions.

A page model can then be created for the web application based on the static content items and the manifest. In certain embodiments, the page model can include a blank web page defined according to, for instance, hypertext markup language ("HTML"), extensible markup language ("XML"), or other suitable languages. The page model can also include a module loader and a list of script modules corresponding to those in the manifest of the web application. The page model can then be saved or stored as an HTTP, XML, or other suitable types of file in a server of the cloud service provider hosting the web site.

Unlike in other web hosting schemes, upon request from a client device, the server provides the page model to the client device instead of a fully rendered web page. Upon receiving the page model from the server, the client device can render the blank web page in a web browser and initiate execution of the script modules. Execution of the script modules can cause the web browser to perform the designed actions and generate web page objects that serve as content for the blank web page. For example, one script module can be configured to display a business calendar for a web page of a business news portal. Thus, unlike in other web hosting systems, execution of web applications is performed on the client device with no risk to hardware/software components of the data center belonging to the cloud service provider.

Most modern web applications are coded in the JavaScript programming language, which is standardized by the ECMAScript language specification. JavaScript is a high-level run-time language that is authored as a script typically as a text file stored on web servers. A web application can reference a script by a universal resource locator ("URL") address. A web browser rendering the web application can retrieve the script from remote servers at the URL address to incorporate script functions. A script module is a type of script configured to export at least one named function or object that can be consumed by a unit (e.g., a building block of code for a web application). As an example, a date module can export functions that produce a current date and holiday dates for a location, which a calendar web application can consume for populating a calendar. Multiple modules can be packed into a bundle for improving loading efficiency for a web page because all needed functions can be downloaded in one file for the bundle rather than in multiple files for the modules. Bundling modules can also reduce unwanted exposure of module functions. For instance, a module intended to be used only by a specific unit can be included internally in a bundle for the specific unit, thereby avoiding exposing the module function to external units.

Most web applications are deployed by an individual or a development team. Deploying a web application can include collecting units of the application, building a release, testing the release, and deploying the release to a production server, where users can access the application. Some of the units for the web application can be collected from third parties. When a unit collected from a third party is updated (e.g., when the third party adds a new feature to the unit), the developer of the application can update and test the application based on the updated unit before deploying a new release of the web application.

However, the foregoing process of testing updated units can sometimes be impossible or impractical. For instance, a web application can include a "plug-in" unit developed by a third party and added to the web application. For privacy and security reasons, the developers of the web application may not be permitted to view the code of the plug-in unit, and therefore cannot test the updated plug-in unit with the web application. As a result, when the web application is updated, the large number of plug-in units can become inoperable.

Several embodiments of the disclosed technology can address at least some of the foregoing challenges by implementing a bundle manifest file that tracks metadata of a bundle. A loader can then use a bundle manifest file for finding compatible versions of a bundle/manifest pair (referred to herein as a "bundle component") as a dependency of another bundle component. The web application can then retrieve and load the compatible bundle in the web page. In one implementation, a client-side loader identifies an identifier and a compatible version of a bundle component that the dependent bundle component depends on in a bundle manifest. The client-side loader can then retrieve, from a bundle manifest repository, a bundle manifest for a bundle component that is the most recent compatible bundle component. The web application can then retrieve the bundle component implementation using a URL included in the retrieved manifest, and load the retrieved bundle component. Several embodiments of the disclosed technology can thus perform versioning on bundles for loading by a web application, ensuring that a bundle that is loaded based on a dependency is compatible with the dependent bundle.

BRIEF DESCRIPTION OF THE DRAWINGS

FIG. 2 is an example text file of a bundle manifest in accordance with embodiments of the disclosed technology.

FIGS. 3A-3B are example user interfaces for web pages generated by a browser receiving user interaction and loading bundle components in response to the user interaction in accordance with embodiments of the disclosed technology.

DETAILED DESCRIPTION

Certain embodiments of systems, devices, components, modules, routines, data structures, and processes for loading a compatible bundle for a dependent bundle are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-6.

As used herein, the term "bundle" generally refers to a group of scripts packaged together. The scripts can comprise modules that export functions that a web application can use. As used herein, the term "dependent bundle" generally refers to a bundle that depends on another bundle. For example, a dependent bundle can use the result of a function provided by another bundle on which the dependent bundle depends. As used herein, the term "bundle manifest" generally refers to a metadata file for a bundle. The metadata file can include data representing various attributes of the bundle, including, inter alia, an identifier for a manifest/bundle pair, a version of the bundle, dependencies of the bundle, and a URL at which the bundle can be retrieved. As used herein, the term "bundle component" generally refers to a manifest/bundle pair. Also used herein, the term "client-side" generally refers to program codes that run as a script inside a web page on a web browser executing on a client device. By contrast, "server-side" code runs on a web server in, for example, a datacenter belonging to a cloud service provider.

Figure 1A:
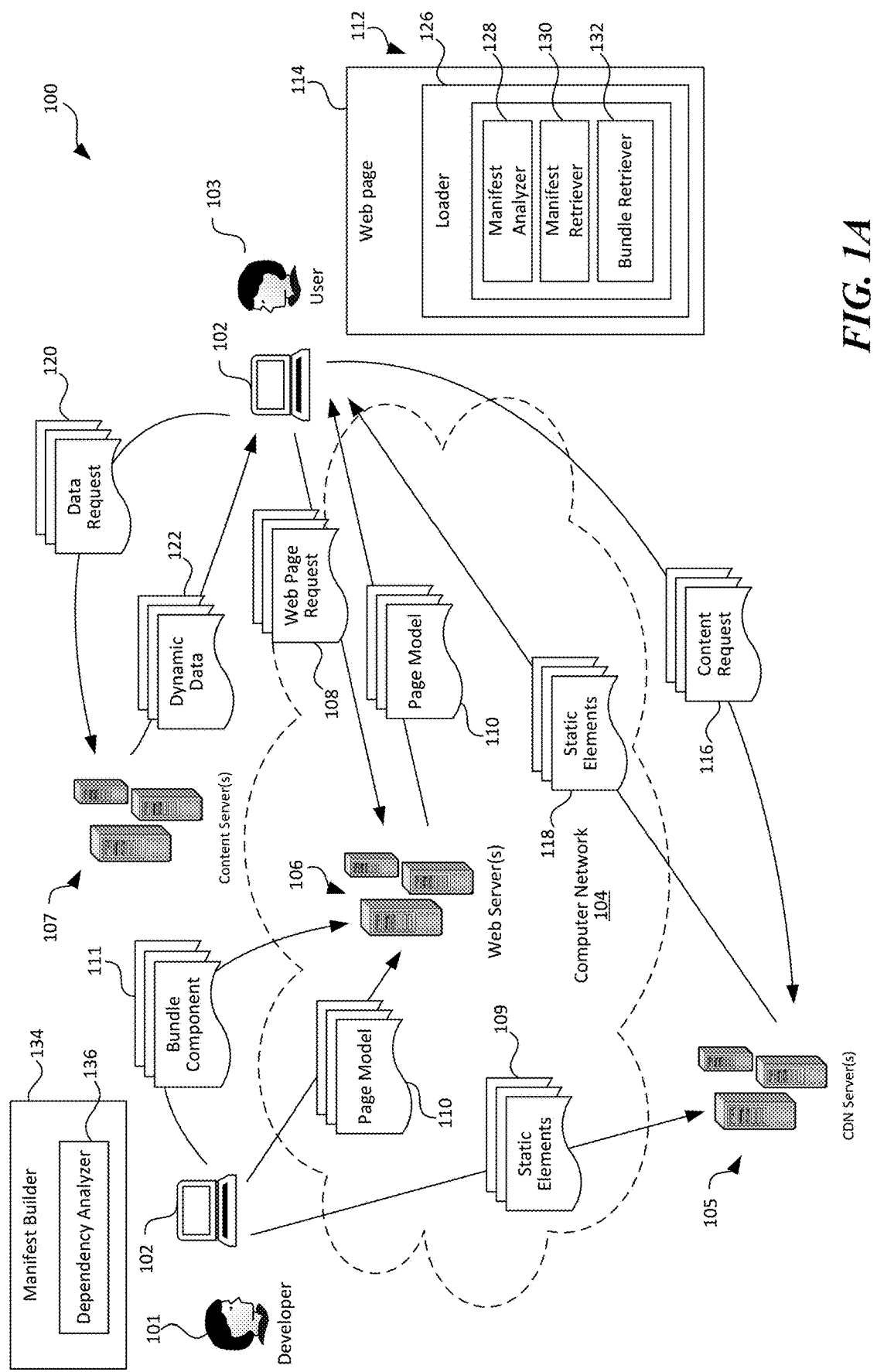
FIGS. 1A-1C are schematic diagrams illustrating a computing system implementing a manifest-driven loader for a web page in accordance with embodiments of the present technology.
Figure 1B:
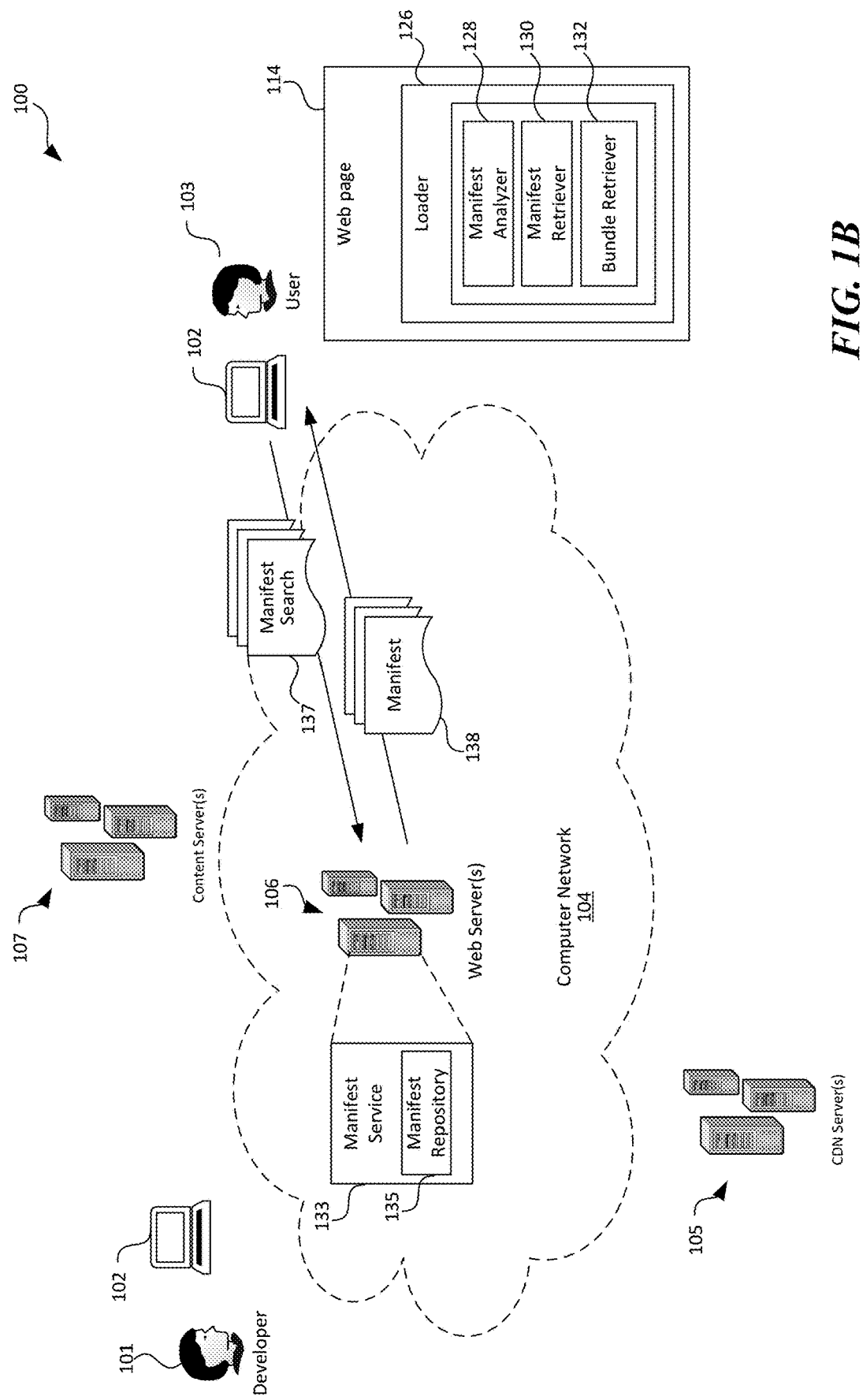
Figure 1C:
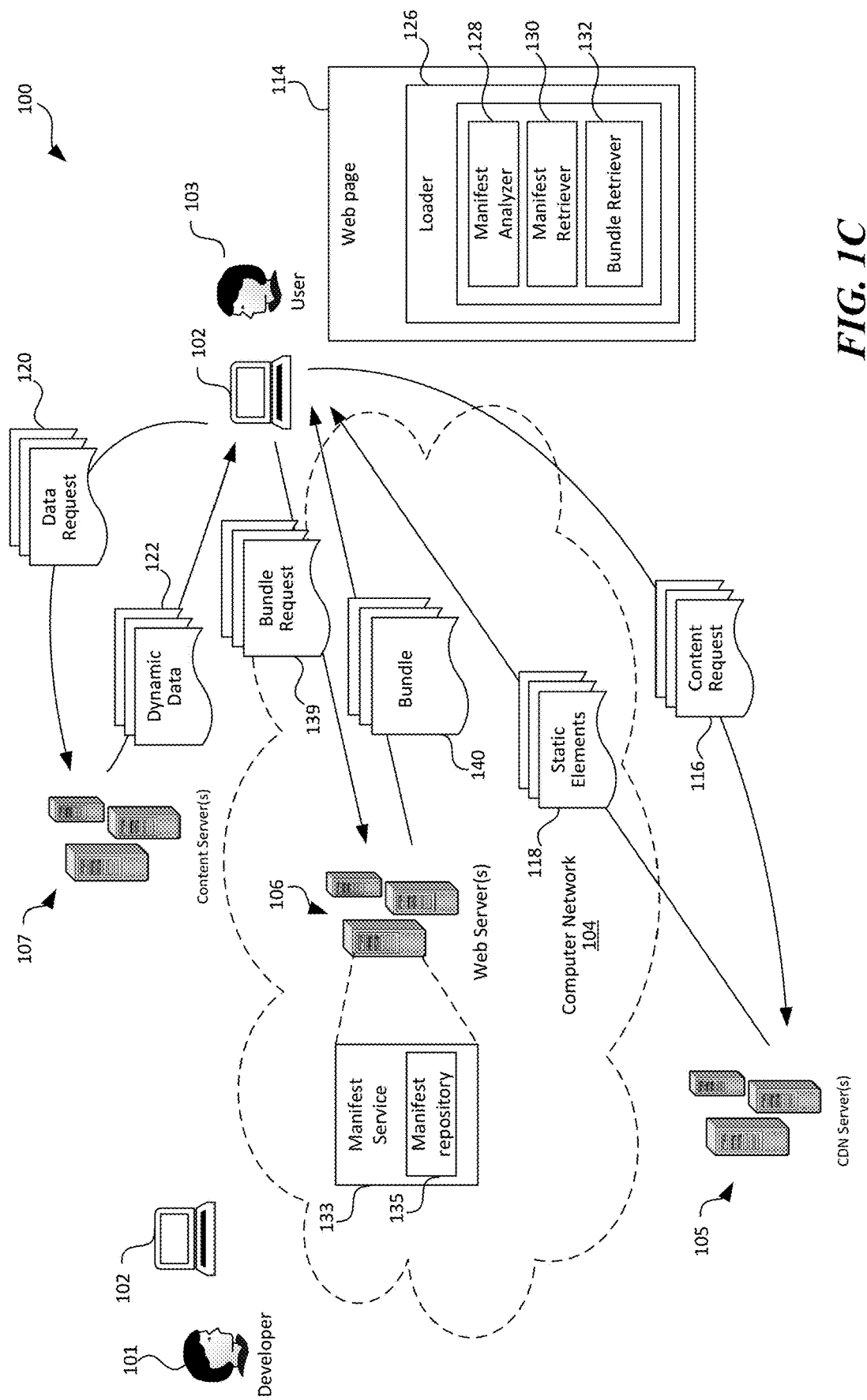

FIGS. 1A-1C are schematic diagrams illustrating a computing system 100 in accordance with embodiments of the present technology. As shown in FIG. 1A, the computing system 100 can include one or more web servers 106, client devices 102, content servers 107, content distribution network ("CDN") servers 105 interconnected by a computer network 104. In certain embodiments, the computer network 104 can include an intranet, an internet (e.g., the Internet), or other suitable types of computer network. The client devices 102 can include desktop, laptop, tablet, or other suitable types of computing devices. The web servers 106, the content servers 107, and the CDN servers 105 can individually include a server, a cluster of servers, or other suitable computing devices.

As shown in FIG. 1A, a developer 101 can create a page model 110 of a web application by using the client device 102. The page model 110 can include a URL or other suitable types of references to a bootloader script, which can include script modules, execution of which can cause a web browser to render a web page object, retrieve information from content servers via a computer network 104, or perform other suitable actions. The bootloader script can be configured to include a loader and embedded bundle components. The embedded bundle components can comprise bundle components that are to be available immediately to the web page upon receiving the page model 110, thereby avoiding separate network operations for obtaining the bundle components. The page model 110 can then be saved in the web servers 106. The developer 101 can also save copies of static elements such as images, texts, etc. in one or more CDN servers 105, for ready distribution.

The developer 101 can also create bundle manifests 138 (shown in FIG. 1B) of bundle components by utilizing a manifest builder 134 having a dependency analyzer 136. The manifest builder 134 can be configured to receive, from the developer 101, metadata for a bundle, including, for example, an identifier for the bundle component, a name of the bundle, a type for the bundle, a version of the bundle, or other suitable metadata related to the bundle component. Bundle metadata received from the developer 101 can be saved as an abbreviated manifest file that omits some fields of the bundle manifest or a full manifest file that includes all fields.

In certain embodiments, the manifest builder 134 can be configured to receive a project (e.g., a package compiled from source files, assets, configuration files, etc.). In response, the dependency analyzer 136 can be configured to scan for package dependencies of the project to generate the bundle manifest 138. For example, the dependency analyzer 136 can scan the package dependencies as defined by the Node Package Manager. In some embodiments, the bundle manifest of a bundle component can be represented by a JavaScript Object Notation ("JSON") data file. An example of a bundle manifest 138 in JSON format is shown and described in more detail below with reference to FIG. 2. In other embodiments, the bundle manifest can be represented in other suitable types of file.

Referring back to FIG. 1A, upon receiving a web page request 108 from the user 103 via the computer network, the web servers 106 can provide the page model 110 to the client device 102 instead of a fully or partially rendered web page. The page model 110 can include a data structure that describes information needed to render a web page 114. Data contained in the page model 110 can be different for each web page 114, while the same bootloader script may be used to render multiple different web pages 114. In certain implementations, data of the page model 110 can be embedded in a visually blank web page 110 that is generated by the web server 106. The bootloader script referenced in the page model 110 can be retrievable from the CDN servers 105, the web server 106, or other suitable sources. Upon receiving the page model 110, in certain embodiments, a web browser 112 on the client device 102 can execute the bootloader script referenced in the page model 110 to render a web page 114. For example, the web page 114 can execute the bootloader script to generate a content request 116 for retrieving various static elements 118 from the CDN servers 105. The web page 114 can also transmit a data request 120 to content servers 107 for retrieving dynamic data 122 from the content server 107. Both the static elements 118 and the dynamic data 122 can then be rendered on web page 114 at the client device 102. In other embodiments, the web browser 112 can request and retrieve the static elements 118 from other suitable sources.

In some embodiments, the web servers 106 can be configured as a content management server ("CMS"), which can host a customizable database for storing web sites, document libraries, web pages, and other content. The CMS enables web pages 114 to be created by the user 103 or other suitable entities. As the author, the user 103 can be an information worker who works directly within the web browser to compose text, graphic, etc., and design visual appearances of the web page 114. Content can include, for example, a page that shows a company news portal, including a business calendar for the company. The user 103 can also add third party plug-ins to the web page 114. Examples of CMS products include WordPress, Drupal, and SharePoint®.

After the author edits the web page 114, the author can save the web page 114 with the edits. In some embodiments, a property data of a plug-in instance, which can be provided by the author, is saved into a database (e.g., a Structured Query Language ("SQL") database) alongside the web page data. In certain embodiments, the web pages 114 can be saved as HTML files or in other suitable manners. In other embodiments, web pages 114 can be stored in a CMS system as a collection of page data fields in a database record. The following shows one such example:

Page Title: ABC Company Portal
 Page Filename: CoPortal.aspx
 Page Author: John Doe
 Page Id: 12345
 Last Saved: 3:02 pm, January 3rd
 Article Text: [formatted text codes]
 Header Image: N/A
 Show In Menu: Yes
 Page Template: Standard Article Page
 . . .

When another user 103 views the web page 114, the CMS system can use the stored data associated with the web pages 114 and the page model 110 to render the HTML output that constitutes the web page 114 as presented by the web browser 112. This runtime rendering has many advantages. For example, if a page template is redesigned, or if a navigation menu is improved, every existing page can automatically reflect these changes.

Several embodiments of the disclosed technology are directed to utilizing bundle manifests useful by the web page 114 for finding and loading suitable bundle components for a web application in order to provide a designed user experience for the web page 114. As shown in FIG. 1A, the web page 114 can include a loader 126 having a manifest analyzer 128, a manifest retriever 130, and a bundle retriever 132 operatively coupled to one another. In other embodiments, the loader 126 can include interface components, input/output components, or other suitable additional or different components.

As shown in FIG. 1A, upon receiving a web page request 108 from the user 103 via the computer network, the web servers 106 can provide the page model 110 to the client device 102. A web browser 112 of the client device 102 can then launch the bootloader script to generate the web page 114. During loading, the manifest analyzer 128 can be configured to determine which bundle components the dependent bundle component depends on. In some embodiments, the manifest analyzer 128 can be configured to identify script resources for dependencies in a manifest associated with the dependent bundle component. In some embodiments, the script resource can comprise an identifier and a version for the bundle component that the dependent bundle component depends on. For example, as shown in FIG. 2, the script resources 154 include the first bundle component dependency 155, which includes an identifier, "1ABF0C79-D41B-44D2-974E-0188081F6A4A," and a version, "1.2.3." The manifest analyzer 128 can be configured to provide the identified metadata to the manifest retriever 130, which can retrieve the manifest for the bundle component depended on by the dependent bundle component.

When the script resources comprise a script resource referred to by a URL, the manifest analyzer 128 can be configured to provide the script resource URL to the bundle retriever 132 for retrieving the bundle component. For example, referring to FIG. 2, the script resources 154 can include the second bundle component dependency 156, which comprises path "dist/help-icons.js". Likewise, in response to the manifest analyzer 128 identifying a localized path type of script resource 154, such as the third bundle component dependency 157, the manifest analyzer 128 can be configured to provide the localized paths to the bundle retriever 132 for retrieving the bundle components. For example, referring to FIG. 2, the script resources 154 can include third bundle component dependency 157, which comprises paths "dist/help-bubble-english-usa.js" for English-United States, "dist/help-bubble-english-canada.js" for English-Canada, and "dist/help-bubble-german.js" for German-Germany. In some embodiments, the manifest analyzer 128 can be configured to identify a locale of the user 103, and to only instruct the bundle retrieving component 132 to retrieve the bundle component according to the URL for the bundle component associated with the locale. For example, the manifest analyzer 128 can identify or determine a locale for the user 103 based on a system parameter of the client device 102 or an IP address associated the client device, according to some embodiments.

As shown in FIG. 1B, the manifest retriever 130 can be configured to retrieve a bundle manifest 138 of a bundle component that is depended on by a dependent bundle component of the web application. The bundle manifest 138 can include a network location for retrieving the bundle component to load for the web application. In certain embodiments, the dependent bundle component may not require a dependency until a later time, for example after the dependent bundle components receives a certain user input via the web browser 112 to perform a desired function. On demand, the dependent bundle component can request the loader 126 to load the bundle component that dependent bundle component depends on.

In some embodiments, the manifest retriever 130 can to be configured to retrieve the bundle manifest 138 of the bundle component from the manifest service 133 (FIG. 1B) in anticipation of the dependent bundle component requesting that the bundle component be loaded. For example, the loader 126 can be configured to retrieve and preload manifests or bundle components so that the bundle components can be executed soon after the HTML page is received by the web browser of the user device 102.

In certain embodiments, the manifest retriever 130 can be configured to communicate with the manifest service 133 hosted in the web servers 106. The manifest service 133 can be configured to access a manifest repository 135, which stores and maintains manifests. The manifest retriever 130 can transmit a manifest search request 137 to the manifest service 133. The manifest search request 137 can include search criteria, including, for example, the identifier and version for the bundle component, taken from the manifest of the dependent bundle component. The manifest service 133 can be configured to search the manifest repository 135 for manifests that meet the search criteria, and the manifest service 133 can be configured to return a manifest 138 meeting the search criteria to the manifest 138.

In some embodiments, the manifest service 133 may not return the manifest 138 for the precise version of the bundle component described by the search criteria. Instead, the manifest service 133 can be configured to find and return the manifest 138 for a different version or versions of the bundle component that is compatible with the bundle component version included in the search criteria. In some embodiments, when multiple versions of the bundle component are available the manifest retriever 130 can be configured to retrieve a manifest for the most recent compatible version of the bundle component. For instance, as shown in FIG. 2, for the bundle component with identifier "1ABF0C79-D41B-44D2-974E-0188081F6A4A," the manifest service 133 may not have found version "1.2.3," as specified in the search criteria, but versions 1.0.1, 1.5.0, 1.5.6, and 2.0.4 can be available, with version 2.0.4 being the latest and with most recent fixes and/or features. However, version 2.0.4 may be incompatible with the bundle component. The manifest retriever 130 can be configured to instead retrieve version 1.5.6 because version 1.5.6 is the most recent compatible version for version 1.2.3. In some embodiments, the manifest retriever 130 retrieves the exact version regardless of whether a newer version is available, e.g. to implement a "safe mode" for handling unforeseen incompatibilities.

The manifest retriever 130 can be configured to perform version mapping, thereby mapping different versions of a bundle component with different dependent bundle components that respectively depend on the different versions of the bundle component. Accordingly, the manifest retriever 130 can be configured to map bundle manifests 138 for versions of the bundle component with the respective different bundle components that depend on the versions. Doing so ensures that a compatible version of the bundle component is loaded for the dependent bundles.

The manifest retriever 130 can also be configured to provide the retrieved bundle manifest 138 to the manifest analyzer 128, which can be configured to identify bundle components with additional dependencies. The manifest analyzer 128 can be configured to provide the manifest retriever 130 with identifiers and version numbers for all additional dependencies of the bundle component so that the manifest retriever 130 can identify and retrieve all needed bundle components.

In some embodiments, the bundle retriever 132 can be configured to automatically download the bundles associated with the retrieved bundle manifest 138. In additional embodiments, the manifest retriever 130 can also automatically download one or more manifests 138 of any other bundles that are depended on, and the bundle retriever 132 can automatically download one or more of the bundles that are depended on. In other embodiments, the bundle retriever 132 can be configured to download any other bundles that are depended on, only in response to receiving a request by the dependent bundle component to load the bundles. As shown in FIG. 1C, based on the received bundle manifest 138, the bundle retriever 132 can be configured to transmit a bundle request 139 to the network location that stores the bundles, for example, the web servers 106. The bundle retriever 132 can be configured to receive a bundle 140 in response. The bundle retriever 132 can be configured to load the retrieved bundle 140, enabling the web browser 112 to execute scripts of the bundle 140 for providing a designed user experience.

In some embodiments, some bundle components are regularly used together, and they can be combined into a single script available for access at a single URL address. In such an embodiment, the same bundle component can be included in several different "meta bundles," as well as a standalone bundle. The bundle retriever 132 can be configured to select a URL for loading the bundle based at least in part on a number of network operations needed, how many extra bundles would be downloaded with the bundle, and other factors, in order to minimize costs associated with downloading the bundle component. In some embodiments, if a first bundle component depends on a first version of a bundle component and a second bundle component depends on a second version of the bundle component, the bundle retriever 132 can be configured to retrieve a most recent compatible version of the bundle for both the first and second bundle components, so that only one bundle needs to be downloaded.

FIG. 2 shows an example JSON file of a bundle manifest 141. The bundle manifest 141 can include these and/or other types of metadata in some embodiments. The bundle manifest 141 can include a bundle component identifier 142, which can comprise a unique identifier such as a Globally Unique Identifier ("GUID"). The bundle manifest 141 can include a version 144 of the bundle component, such as "1.2.3". The bundle manifest 141 can include a bundle component type 146, which can comprise a functional role of the bundle component (e.g., application, library, plug-in, extension). The bundle manifest 141 can include a loader configuration section 148, which is information that is used by the loader. The loader configuration section 148 can comprise an entry module identifier 150, which can comprise a name of a main bundle for the bundle component when the bundle component includes multiple bundles. The loader configuration section 148 can also comprise at least one internal module base URL 152, which can be used to construct a network location for a resource. In some implementations, multiple URLs are associated with a bundle in case the bundle cannot be accessed at a first location.

The loader configuration section 148 can also comprise script resources 154. Script resources 154 can comprise a list of bundle components that the bundle component depends on. The configuration section can include various types of script resources. A first type is a bundle component type, which comprises a first bundle component dependency 155. A bundle component type includes a dependency on another bundle component. In some embodiments, the bundle component that the bundle component of the manifest 141 depends on can be identified by bundle component identifier and version. The version can represent the latest version of the bundle component that the dependent bundle was tested to be compatible with. A second type of script resource is a path type, which comprises a second bundle component dependency 156, and which includes a specific script resource that the bundle component depends on. In some embodiments, the script resource can comprise a URL for the bundle component that is depended on. In some embodiments, a debug path can also be specified, which can be used for loading a diagnostic build of the script when debugging. A third type of script resource, which comprises a third bundle component dependency 157, is a localized path type, which can include a table or list of URLs, one for each locale, such as a URL for each of "English-United States," "English-Canada," and" German-Germany.

Figure 3A:
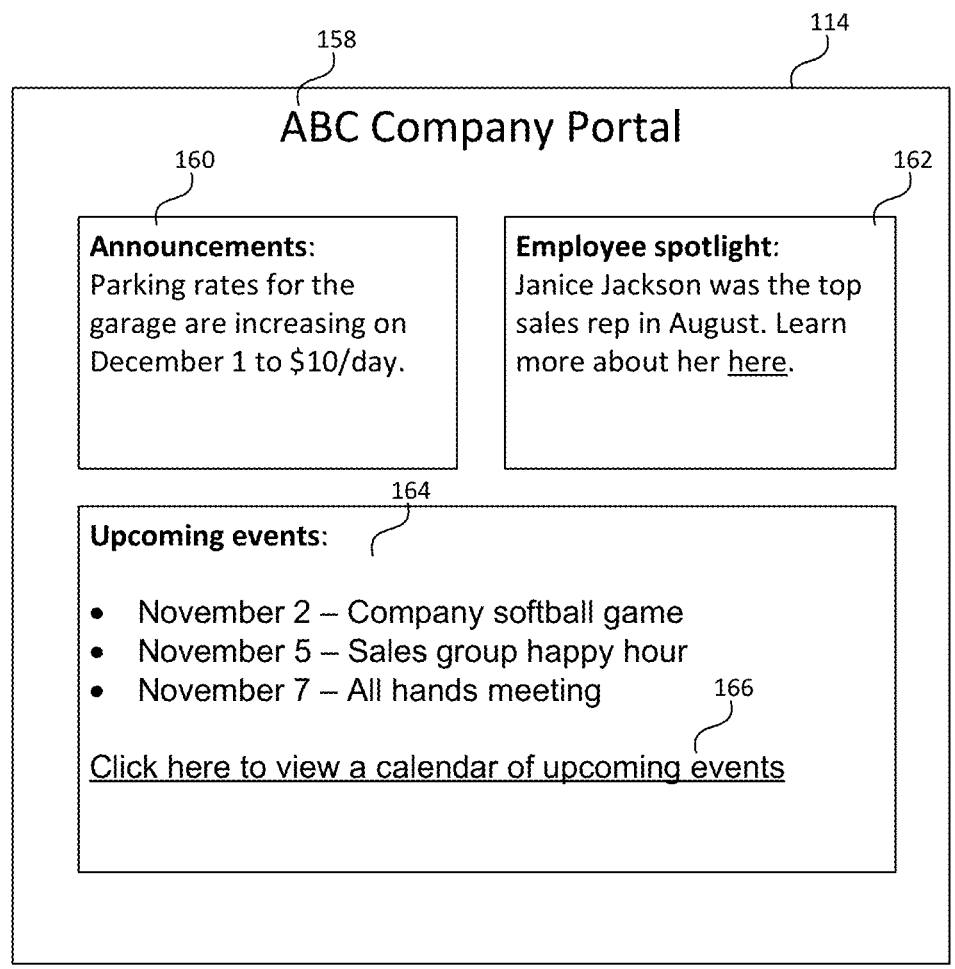

FIG. 3A shows an example graphical user interface of the web page 114 generated by the web browser. In the example of FIG. 3A, the web page 114 is rendered by a web application 158 for a company news portal. The web application 158 displays an announcements object 160, an employee spotlight object 162, and an upcoming events object 164. Each of the objects can be generated based at least in part on executing a bundle component. For example, the web page 114 can generate the upcoming events object 164 based on execution of an upcomingEvents bundle component.

The upcoming events object 164 includes a link 166 for launching a calendar of upcoming events. Upon receiving a selection by a user of the link 166, the upcomingEvents bundle component can generate a request for the loader 126 to load a businessCalendar bundle component. The loader 126 can identify script resources in a bundle manifest for the upcomingEvents bundle component, and the script resources can include a bundle component identifier and a version for the businessCalendar bundle component, which the upcomingEvents bundle component depends on and was configured to be compatible with.

The loader 126 can be configured to search the manifest repository for a manifest associated with the most recent compatible businessCalendar bundle component, and manifests for any bundle components that are depended on by the businessCalendar bundle component, and manifests for any other bundle components that are depended on. For example, the loader 126 can identify multiple bundle components that the businessCalendar bundle component depends on in the manifest associated with the businessCalendar bundle component, including, for example, a loggingSystem bundle component, which can export functions such as writeLogMessage and reportError. If, for example, the loggingSystem bundle component were modified by its publisher, the loader can retrieve the version of the loggingSystem bundle component that the businessCalendar bundle component is compatible with, by retrieving the most recent compatible bundle component when the precise version is not available. FIG. 3B shows a web page 114 displaying a calendar object 168. The web page 114 can be configured to generate the calendar object 168 based on the execution of the businessCalendar bundle component that includes scripts for generating graphics of the calendar object and for populating the calendar with events, such as a holiday 172.

Figure 4:
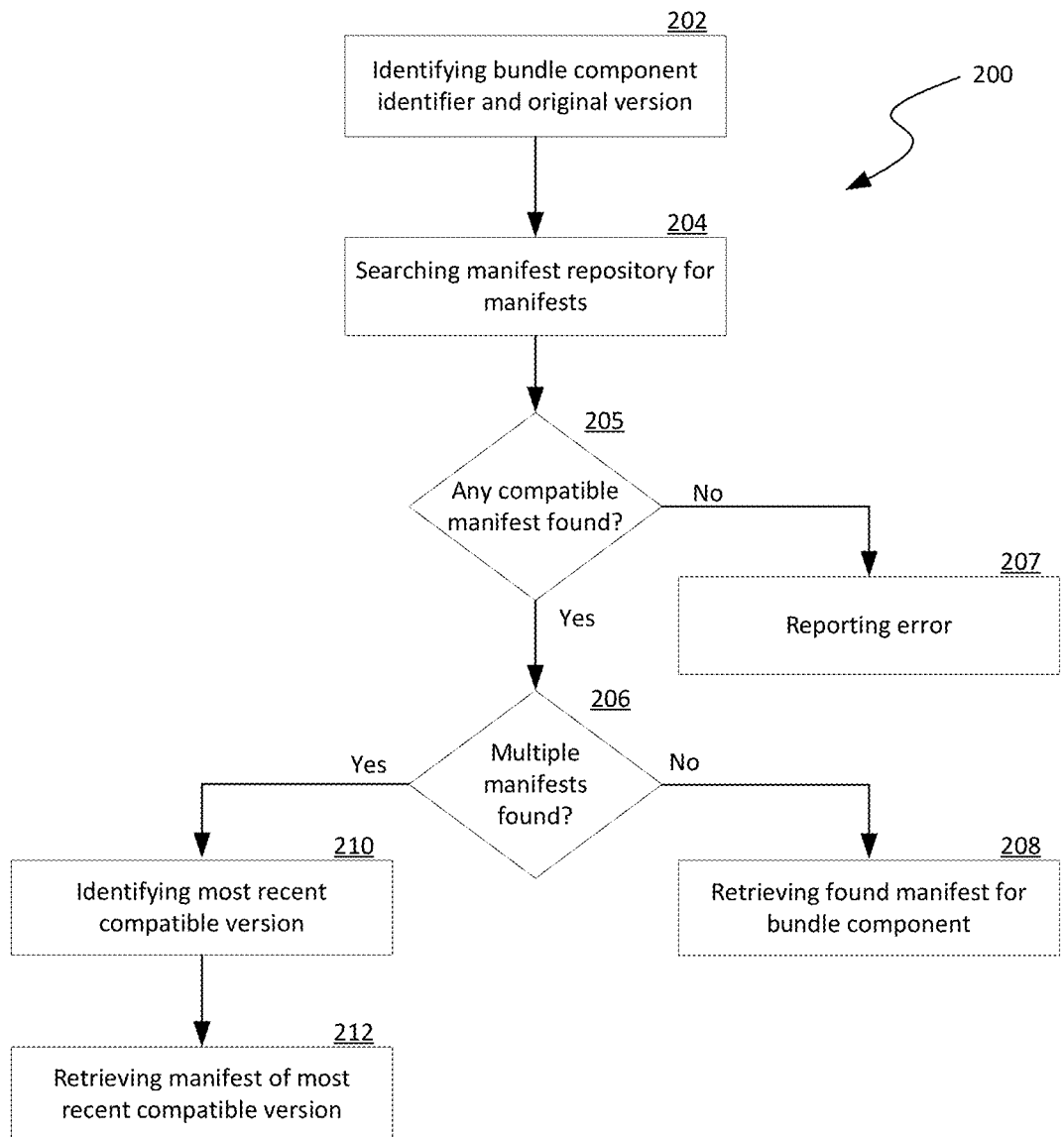
FIG. 4 is a flowchart illustrating a process for loading a bundle component that is compatible with a dependent bundle component in accordance with embodiments of the disclosed technology.

FIG. 4 is a flowchart illustrating various processes of loading a bundle component depended on by a dependent bundle component. Even though various embodiments of the processes are described below with reference to the computing system 100 of FIG. 1, in other embodiments, the processes can also be performed with other suitable types of computing frameworks, systems, components, or modules.

As shown in FIG. 4, a process 200 can include identifying, in a manifest for a dependent bundle component, a bundle component identifier and an original version for a bundle component that the dependent bundle component depends on at stage 202. For example, the dependent bundle component can comprise a bundle component already loaded for a web application whose scripts are being executed by the web browser. A manifest for the dependent bundle component can include an identifier and a version for a bundle component that the dependent bundle component depends on. In some implementations, the identifier and version for a bundle component that the dependent bundle depends on are identified in response to receiving an instruction from the dependent bundle component to load the bundle component that it depends on. The operations include searching a manifest repository for manifests that include the bundle component identifier at stage 204. For example, manifests in the manifest repository can comprise a bundle component identifier, and the identifier for the bundle component that the dependent bundle component depends on can be compared to identifiers in manifests in the manifest repository. The process 200 can then include a decision stage 205 for determining whether any compatible manifest is found. In response to determining that no compatible manifest is found, the process 200 can include reporting an error at stage 207.

In response to determining that at least one compatible manifest is found, the process 200 can then proceed to another decision stage 206 for determining whether multiple manifests are found that include the bundle component identifier. For example, the bundle component repository can include multiple versions of the bundle component that the dependent bundle component depends on. When there are not multiple manifests including the same bundle component identifier, the operations include retrieving the found manifest for the bundle component that the dependent bundle component depends on at stage 208. When multiple manifests are found, the operations include identifying a manifest for a most recent compatible version of the bundle component that the dependent bundle component depends on at stage 210. The operations then include retrieving the manifest for the compatible bundle component at stage 212. When the bundle component is to be loaded, such as when a function of the bundle component is needed by the dependent bundle component, the bundle component can be downloaded via a URL included in the manifest.

Figure 5:
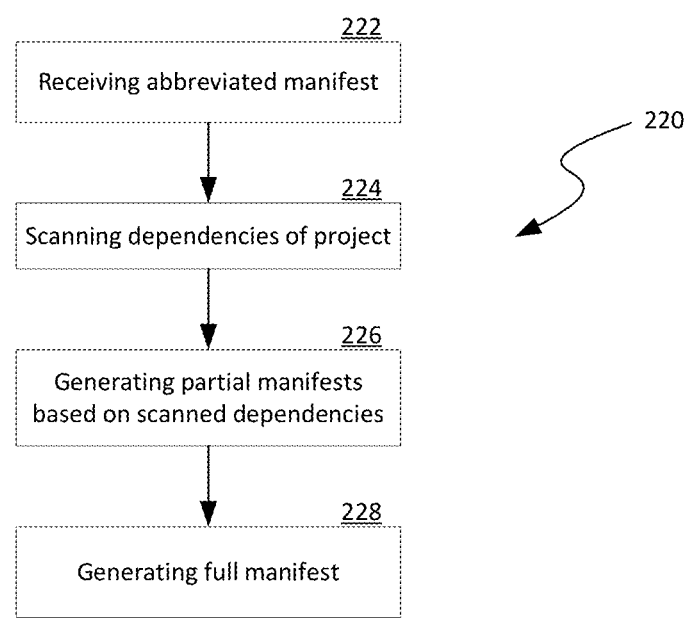
FIG. 5 is a flowchart illustrating a process for generating a manifest of a bundle component in accordance with embodiments of the disclosed technology.

FIG. 5 is a flowchart illustrating various processes of utilizing a manifest builder for generating manifests associated with bundles, thereby creating a bundle component. Even though various embodiments of the processes are described below with reference to the computing system 100 of FIG. 1, in other embodiments, the processes can also be performed with other suitable types of computing frameworks, systems, components, or modules.

As shown in FIG. 5, a process 220 includes receiving an abbreviated manifest at stage 222. The abbreviated manifest can be received from a developer, for example. In some embodiments, the abbreviated manifest can include an identifier for the bundle component, a name of the bundle, a type for the bundle, and a version of the bundle. The process 220 can also include scanning dependencies of a project at stage 224. For example, the project can rely on other packages (i.e., dependencies) that operate together to perform functions of a web application. The manifest builder can scan the dependencies for the project according to the Node Package Manager system, and the operations can include extracting manifests from the scanned dependencies at stage 226. The operations can also include combining the extracted information with the abbreviated manifest to produce a full manifest at stage 228.

Several embodiments of the disclosed technology can return different implementations to different bundle components that request the same version of a special "context sensitive" bundle component. The disclosed technology can thus generate a loader configuration dynamically based on context in which a bundle component is loaded. This context sensitive loading strategy can be leveraged in various ways. For example, in some embodiments, a bundle component can be configured to access its own manifest by loading a special package that returns such information. Another example of a context-sensitive import is a logging component whose writeLogMessage function can automatically include a caller's bundle component identifier in a log because it knows what bundle component is calling it based on a manifest; different components receive a different proxy implementation of the underlying writeLogMessage implementation.

Various plug-ins can be represented as bundle components, and in some embodiments, their manifest files can be extended to describe additional metadata for a given type of plug-in. In some embodiments, a bundle component can comprise any plug-in API contract that has been formalized using the manifest system defined by the loader. Some examples of bundle components, according to some embodiments, include client-side web parts (i.e., web page objects or models), client-side applications, client-side extensions, client-side page layouts, etc. For a web part, the additional specialized manifest metadata can include a title of the web part, property definitions thereof, a gallery icon, and a search crawler configuration. For a client-side application, the additional metadata can include a page model, legacy compatibility, and preload options.

Figure 6:
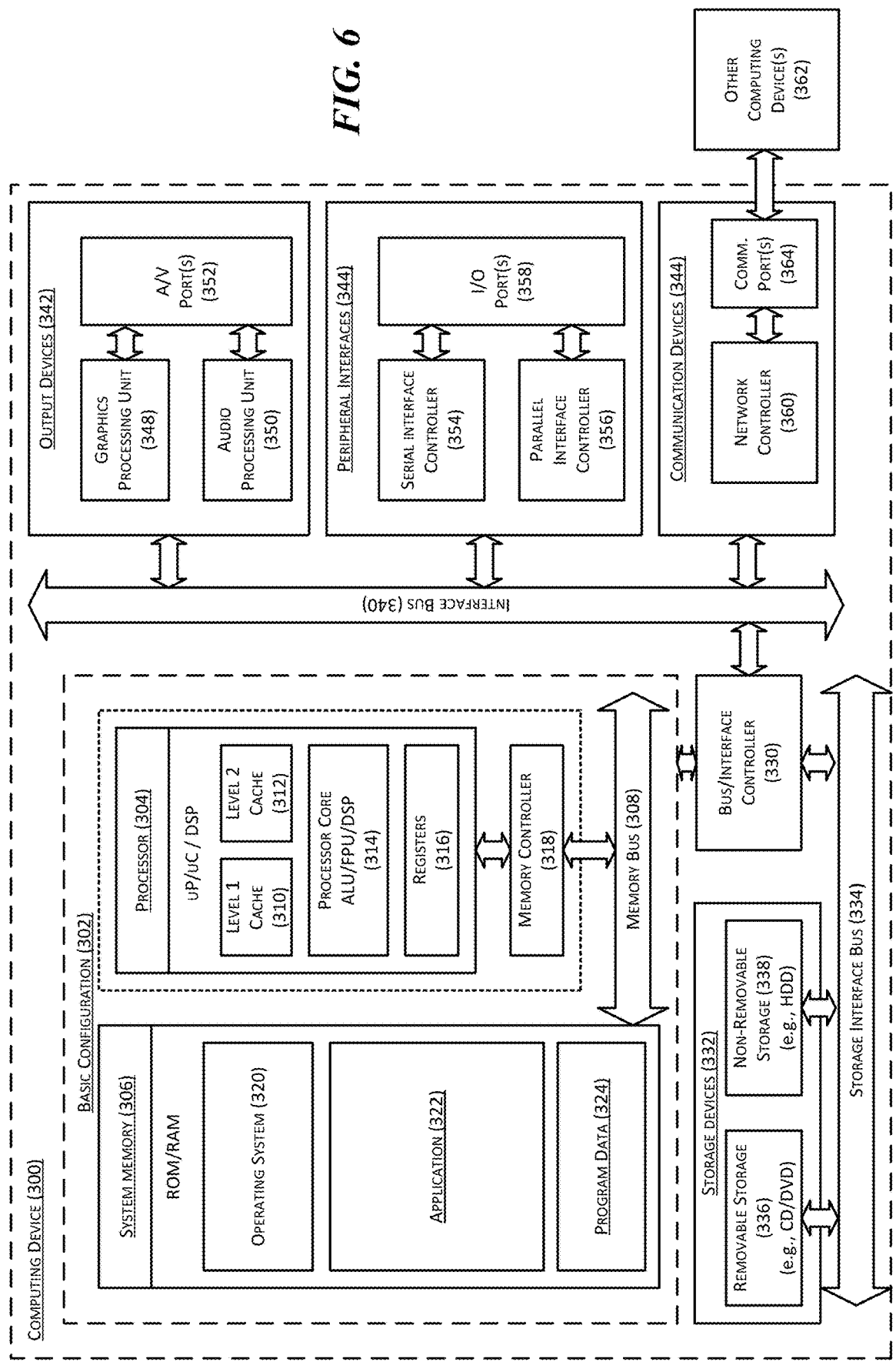
FIG. 6 is a computing device suitable for certain components of the computing system in FIG. 1.

FIG. 6 is a computing device 300 suitable for certain components of the computing system 100 in FIG. 1. For example, the computing device 300 can be suitable for the web servers 106, the CDN server 105, the content server 107, or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR), and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications can be made without deviating from the disclosure. In addition, many of the elements of one embodiment can be combined with other embodiments in addition to or in lieu of the elements of the other embodiments. Accordingly, the technology is not limited except as by the appended claims.

We claim:

1. A method of loading a web page of a web site providing a web application in a web browser, comprising:
  receiving, via a computer network, a first bundle and a corresponding manifest of the web application, the first bundle comprising one or more scripts or bundles executable by the web browser for loading the web page or a portion thereof, wherein the manifest includes metadata describing each of the one or more scripts or bundles included in the first bundle;
  upon receiving the first bundle and the manifest, identifying, based on the metadata in athe manifest, (i) a bundle identifier of a second bundle that is included in and depended on by the first bundle and (ii) a version identifier of the second bundle, the second bundle comprising one or more of additional scripts or bundles executable by the web browser for loading the web page or a portion thereof;
  searching, via a computer network, a manifest repository for additional manifests having metadata describing the second bundle based on the identified bundle identifier of the second bundle;
  for each manifest found during searching the manifest repository, comparing version information of the manifest with the identified version identifier of the second bundle to select one of the manifests having a most recent compatible version for the second bundle;
  determining, based on metadata in the selected one of the manifests, a network location at which the second bundle having the most recent compatible version resides; and
  downloading, via the computer network, the second bundle having the most recent compatible version from the determined network location and executing the downloaded second bundle by the web browser.

2. The method of claim 1, further comprising:
  identifying, in the selected manifest of the second bundle, (i) another bundle identifier of a third bundle that is depended on by the second bundle and (ii) another version identifier for the third bundle; and
  repeating the searching, comparing, determining, and downloading operations for the third bundle.

3. The method of claim 1, further comprising:
  receiving a request by the first bundle to load the second bundle; and
  in response to receiving the request by the first bundle, loading the second bundle that is depended on by the first bundle.

4. The method of claim 1, further comprising subsequent to selecting the manifest having the most recent compatible version for the second bundle, automatically performing the determining and downloading operations for the second bundle.

5. The method of claim 1 wherein:
  the manifest is a first manifest;
  the downloaded second bundle is a first implementation of the second bundle; and
  the method further includes:
    identifying, in a second manifest associated with a third bundle, (i) a bundle identifier of the second bundle that is depended on by the third bundle and (ii) a version identifier for the second bundle, each of the second and third bundles comprising scripts executable by the web browser for loading the web page or a portion thereof; and
    searching the manifest repository for additional manifests describing the second bundle based on the identified bundle identifier of the second bundle and an original identifier of the third bundle;
    based on the original identifier of the third bundle that is depended on by the third bundle, selecting another one of the manifests having a most recent compatible version for the second bundle, the selected manifest corresponding to a second implementation of the second bundle different than the first implementation of the second bundle.

6. The method of claim 1 wherein:
  searching the manifest repository includes receiving a search result indicating that a manifest found during the searching of the manifest repository comprises the version identifier for the second bundle; and
  comparing the version information includes, in response to receiving the search result, selecting the manifest having the version identifier for the second bundle.

7. The method of claim 1 wherein downloading, by the web browser from the network location, the second bundle includes downloading, by the web browser from the network location, the second bundle and a third bundle that is depended on by the second bundle.

8. The method of claim 1 wherein the manifest associated with the first bundle includes one or more of a bundle component identifier, a version number associated with the bundle component, or a bundle component type.

9. The method of claim 1 wherein the first and second bundles individually include a group of scripts individually configured to export one or more functions to other scripts in the first or second bundles.

10. A computing device, comprising:
a processor; and
a memory containing instructions executable by the processor to cause the computing device to:
receive, via a computer network, a first bundle and a corresponding manifest of a web application, the first bundle comprising one or more scripts or bundles executable by a web browser on the computing device for loading a web page or a portion thereof, wherein the manifest includes metadata describing each of the one or more scripts or bundles included in the first bundle;
upon receiving the first bundle and the manifest, identify, in the manifest associated with the first bundle, (i) a bundle identifier of a second bundle that included in and is depended on by the first bundle and (ii) a version identifier of the second bundle, the second bundles comprising additional scripts or bundles executable by the web browser for loading the web page;
search, via the computer network, a manifest repository for additional manifests describing the second bundle based on the identified bundle identifier of the second bundle;
for each manifest found during searching, compare version information of the manifest with the identified version identifier of the second bundle to select one of the manifests having a most recent compatible version for the second bundle, wherein the selected one of the manifests includes metadata describing a network location at which the corresponding second bundle is accessible; and
retrieve, by the web browser, the second bundle from the network location described in the selected one of the manifests and execute the retrieved second bundle by the web browser.

11. The computing device of claim 10 wherein the memory contains further instructions executable by the processor to cause the computing device to:
identify, in the selected manifest of the second bundle, (i) another bundle identifier of a third bundle that is depended on by the second bundle and (ii) another version identifier for the third bundle; and
repeat the searching, comparing, determining, and retrieving operations for the third bundle.

12. The computing device of claim 10 wherein:
to search the manifest repository includes to receive a search result indicating that none of the manifests found during the searching of the manifest repository comprise the version identifier for the second bundle; and
to compare the version information includes, in response to receiving the search result, select one of the manifests having a most recent compatible version for the second bundle.

13. The computing device of claim 10 wherein:
to search the manifest repository includes receiving a search result indicating that a manifest found during the searching of the manifest repository comprises the version identifier for the second bundle; and
to compare the version information includes, in response to receiving the search result, select the manifest having the version identifier for the second bundle.

14. The computing device of claim 10 wherein the manifest associated with the first bundle includes one or more of a bundle component identifier, a version number associated with the bundle component, or a bundle component type.

15. The computing device of claim 10 wherein:
the manifest associated with the first bundle includes one or more of a bundle component identifier, a version number associated with the bundle component, or a bundle component type;
the bundle component includes a group of scripts individually configured to export one or more functions, strings, objects, numbers, Booleans, or arrays to other scripts; and
the memory contains additional instructions executable by the processor to cause the computing device to execute the scripts in the web browser to render the web page.

16. A method of loading a web page of a web site providing a web application in a web browser, comprising:
receiving, via a computer network, a first bundle and a corresponding first manifest file of the web application, the first bundle comprising one or more scripts or bundles executable by the web browser for loading the web page or a portion thereof, wherein the first manifest file includes metadata describing each of the one or more scripts or bundles included in the first bundle;
analyzing the first manifest file associated with the first bundle, the first manifest file containing (i) a bundle identifier of a second bundle that is included in and depended on by the first bundle and (ii) a version identifier of the second bundle;
transmitting, via a computer network, a query to a manifest repository for a second manifest file containing metadata describing additional scripts of the second bundle based on the bundle identifier of the second bundle included in the first manifest file;
receiving, via the computer network and from the manifest repository, a response containing multiple manifest files related to different versions of the second bundle;
in response to receiving the response, selecting one of the manifest files having a most recent compatible version for the identified version identifier of the second bundle, wherein the selected one of the manifests includes metadata describing a network location at which the corresponding second bundle is accessible; and
retrieving and executing, by the web browser, the second bundle corresponding to the selected one of the manifest files according to the network location described in the selected one of the manifests, thereby rendering a web page in the web browser with a current version.

17. The method of claim 16 wherein analyzing the first manifest file includes scanning the first manifest file to determine that the first bundle depends on the second bundle.

18. The method of claim 16, further comprising:
identifying, in the selected manifest of the second bundle, (i) another bundle identifier of a third bundle that is depended on by the second bundle and (ii) another compatible version identifier for the third bundle; and
repeating the searching, comparing, determining, and downloading operations for the third bundle.

19. The method of claim 16 wherein the manifest associated with the first bundle includes one or more of a bundle component identifier, a version number associated with the bundle component, or a bundle component type.

20. The method of claim 16 wherein:
the manifest associated with the first bundle includes one or more of a bundle component identifier, a version number associated with the bundle component, or a bundle component type;
the bundle component includes a group of scripts individually configured to export one or more functions to other scripts; and
the method further includes executing the scripts in the web browser to render the web page.

* * * * *